United States Patent Office 2,721,866
Patented Oct. 25, 1955

2,721,866

PROCESS OF MANUFACTURE OF 6-MERCAPTO PURINE AND INTERMEDIATE THEREFOR

George H. Hitchings, Tuckahoe, and Gertrude B. Elion, Bronxville, N. Y., assignors to Burroughs Wellcome & Co. (U. S. A.) Inc., Tuckahoe, N. Y., a corporation of New York No Drawing. Application April 22, 1954, Serial No. 425,036

4 Claims. (Cl. 260—252)

The present invention relates to derivatives of purine and in particular to the synthesis of the compound 6-mercaptopurine.

6-mercaptopurine has valuable pharmaceutical properties in the control of neoplastic growth in animals and in the production of remissions in human leukemias.

Former methods for its production have involved heating 6-hydroxypurine with phosphorus pentasulphide or 6-chloropurine with thiourea or potassium hydrosulphide.

These former methods have both been found to have certain disadvantages and it is the object of the present invention to provide a new process for the preparation of 6-mercaptopurine which avoids these disadvantages.

It has been found that the reaction of 4-amino-5-nitro-6-chloropyrimidine (I) with an excess of potassium hydrosulphide results in the simultaneous replacement of the chloro by a mercapto group and reduction of the nitro group to give the new pyrimidine 4,5-diamino-6-mercaptopyrimidine (II). By treatment with formic acid, this is converted to 7-amino-thiazolo (5,4-d)-pyrimidine (III). The cyclization of the latter to the purine (IV) is carried out preferentially by heating the sodium salt of III.

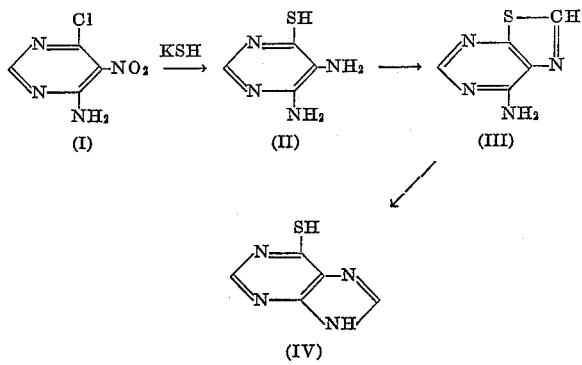

This new method is especially notable for the high purity of the product and for the high yield obtained. Treatment with alkali followed by heating at 240° for one hour represents the preferred conditions for the isomerization reaction. Apparently the thiazolo derivative forms a sodium salt of a 4-amino-5-formamido-6-mercaptopyrimidine derivative which then recyclizes to form the 6-mercaptopurine. Isomerization may, however, also be obtained under other conditions, for example by heating compound III with formic acid and formyl morpholine, or with formamide, though these methods give less good yields and purification of the product was made more difficult by the products of side reactions. However, such other methods of cyclization also fall within the scope of the invention.

The invention will now be described with reference to the accompanying example in which all temperatures are given in degrees centigrade.

EXAMPLE

4,5-diamino-6-mercaptopyrimidine 7.5 grams of 4-amino-6-chloro-5-nitropyrimidine was suspended in 200 ml. of 1 N-potassium hydrosulphide and heated on the steam bath for two hours while passing hydrogen sulphide through the reaction mixture. The reaction mixture was allowed to cool slowly, acidified with 10N sulphuric acid and chilled. The precipitate consisted of 4,5 diamino-6-mercaptopyrimidine and sulphur. It was boiled with 300 ml. of water, filtered hot and then chilled. The product precipitated as pale yellow needles (4.2 g.); an additional 0.95 g. was obtained by concentration of the mother liquors to 100 ml. The ultraviolet absorption spectrum of 4,5-diamino-6-mercaptopyrimidine shows maxima at 240 and 305 m$\mu$ at pH 1 and at 240 and 310 m$\mu$ at pH 11.

7-amino-thiazolo (5,4-d)-pyrimidine

A mixture of 2 g. of 4,5-diamino-6-mercapto-pyrimidine and 10 ml. of 98% formic acid was heated at 70° for two hours and then evaporated to dryness on the steam bath. The residue, 7-amino-thiazolo (5,4-d)-pyrimidine has an ultraviolet absorption spectrum completely different from the starting material $\lambda$ max.—263 m$\mu$ at pH 1; $\lambda$ max.—261 m$\mu$ at pH 11.

6-mercaptopurine

To 820 mg. of 7-amino-thiazolo(5,4-d)-pyrimidine was added 2.5 cc. of 2 N sodium hydroxide. The water was removed under reduced pressure. The sodium salt was then heated at 240° for one hour, during which time it melted, gave off water and resolidified. The sodium salt 6-mercaptopurine was dissolved in 15 ml. of water and acidified to pH 5 with acetic acid. Yellow crystals of 6-mercaptopurine hydrate precipitated. This compound has a characteristic ultraviolet absorption spectrum: $\lambda$ max.—325 m$\mu$ at pH 1; $\lambda$ max.—232, 312 m$\mu$ at pH 11.

What is claimed is:

1. The method of preparing a 6-mercaptopurine which consists in the steps of reacting a 4-amino-5-nitro-6-chloropyrimidine with an alkali hydrosulfide to convert it to a 4,5-diamino-6-mercaptopyrimidine, formylating the latter by heating with formic acid to give a 7-amino-thiazolo (5,4-d)-pyrimidine and heating the latter compound in the presence of alkali to produce the 6-mercaptopurine.

2. The method of preparing 6-mercaptopurine which consists in the steps of reacting 4-amino-5-nitro-6-chloropyrimidine with an alkali hydrosulfide to convert it to 4,5-diamino-6-mercaptopyrimidine, formylating the latter by heating with formic acid to give 7-amino-thiazolo (5,4-d)-pyrimidine and heating the latter compound in the presence of alkali to produce the 6-mercaptopurine.

3. The method of preparing 4,5-diamino-6-mercaptopyrimidine which consists in the step of reacting 4-amino-5-nitro-6-chloropyrimidine with an alkali hydrosulfide.

4. As a new compound 4,5-diamino-6-mercaptopyrimidine.

References Cited in the file of this patent

Beilstein, Vierte Auflage, vol. 24, p. 476.